US008873889B2

(12) United States Patent
Koga et al.

(10) Patent No.: US 8,873,889 B2
(45) Date of Patent: Oct. 28, 2014

(54) IMAGE PROCESSING APPARATUS

(75) Inventors: Shunichi Koga, Tokyo (JP); Masayuki Tanaka, Tokyo (JP); Masatoshi Okutomi, Tokyo (JP)

(73) Assignees: Tokyo Institute of Technology, Meguro-ku, Tokyo (JP); Olympus Corporation, Shibuya-Ku, Tokyo (JP)

( * ) Notice: Subject to any disclaimer, the term of this patent is extended or adjusted under 35 U.S.C. 154(b) by 84 days.

(21) Appl. No.: 13/578,542

(22) PCT Filed: Feb. 10, 2011

(86) PCT No.: PCT/JP2011/053433
§ 371 (c)(1),
(2), (4) Date: Oct. 31, 2012

(87) PCT Pub. No.: WO2011/099647
PCT Pub. Date: Aug. 18, 2011

(65) Prior Publication Data
US 2013/0084027 A1 Apr. 4, 2013

(30) Foreign Application Priority Data

Feb. 12, 2010 (JP) ................. 2010-028857

(51) Int. Cl.
*G06K 9/32* (2006.01)
*H04N 5/232* (2006.01)
*H04N 1/387* (2006.01)
*G06T 3/40* (2006.01)

(52) U.S. Cl.
CPC .................. *G06K 9/32* (2013.01); *H04N 5/232* (2013.01); *H04N 1/3871* (2013.01); *G06T 3/4053* (2013.01)
USPC ............ 382/299; 382/276; 382/284; 382/298

(58) Field of Classification Search
CPC ..... G06T 3/4053; G06T 3/4069; G06T 3/4007
USPC ............ 382/276, 284, 298, 299, 293; 358/451
See application file for complete search history.

(56) References Cited

U.S. PATENT DOCUMENTS

2009/0189900 A1* 7/2009 Furukawa et al. ............ 345/428
2012/0213452 A1* 8/2012 Matsuyama et al. .......... 382/294

FOREIGN PATENT DOCUMENTS

JP 2006-309649 11/2006
JP 2007-266667 10/2007

(Continued)

OTHER PUBLICATIONS

Gotoh et al., "High Resolution Color Image Reconstruction Using Raw Data of a Single Imaging Chip", vol. 45, No. SIG 8(CVIM 9), Jun. 15, 2004, pp. 15-25.

(Continued)

*Primary Examiner* — Ali Bayat
(74) *Attorney, Agent, or Firm* — Nixon Peabody LLP; Jeffrey L. Costellia

(57) ABSTRACT

An image processing apparatus comprises a processing unit for computing displacement amounts between a basis image and each reference image, a processing unit for generating multiple deformed images based on the displacement amounts, the basis image and multiple reference images, a processing unit for setting a threshold of a parameter, a processing unit for selecting image information from the reference image by the threshold, a processing unit for generating composed images and weighted images based on the basis image, the displacement amounts and the image information, a processing unit for generating high-resolution grid images by dividing the composed image by the weighted image, a processing unit for generating simplified interpolation images based on high-resolution grid images, a processing unit for generating assistance images, a display unit for displaying the assistance images and a control unit that controls the necessary processing as necessary.

14 Claims, 11 Drawing Sheets

(56) References Cited

FOREIGN PATENT DOCUMENTS

| | | |
|---|---|---|
| JP | 2007-305113 | 11/2007 |
| JP | 2008-077501 | 4/2008 |
| JP | 2008-092297 | 4/2008 |
| JP | 2008-234130 | 10/2008 |
| JP | 2009-124340 | 6/2009 |
| JP | 2009-188891 | 8/2009 |
| JP | 2010-108161 | 5/2010 |
| WO | WO 2004-063991 A1 | 7/2004 |
| WO | WO 2004-068862 A1 | 8/2004 |
| WO | WO 2008-102898 A1 | 8/2008 |
| WO | WO 2011-099648 A1 | 8/2011 |

OTHER PUBLICATIONS

Shimizu et al., "Precise Simultaneous Estimation of Image Deformation N-Parameter With Its Application on Super-Resolution", vol. 45, No. SIG 13(CVIM 10), Dec. 15, 2004, pp. 83-98.

Toda et al., "Super-Resolution Considering Registration Error", FIT2006, pp. 63-64.

International Search Report for PCT/JP2011/05343, Dated Mar. 22, 2011.

* cited by examiner (B)

COMPOSED IMAGE (R)

COMPOSED IMAGE (G)

COMPOSED IMAGE (B)

□ : DEFINED PIXEL (FILLED)
■ : UNDEFINED PIXEL (UNFILLED)

(C)

| 3 | 0 | 3 | 0 | 3 |
|---|---|---|---|---|
| 2 | 1 | 0 | 0 | 0 |
| 3 | 0 | 2 | 0 | 2 |
| 0 | 0 | 0 | 1 | 0 |
| 3 | 0 | 2 | 0 | 3 |

WEIGHTED IMAGE (R)

| 3 | 0 | 3 | 0 | 3 |
|---|---|---|---|---|
| 2 | 1 | 0 | 0 | 0 |
| 3 | 0 | 2 | 0 | 2 |
| 0 | 0 | 0 | 1 | 0 |
| 3 | 0 | 2 | 0 | 3 |

WEIGHTED IMAGE (G)

| 3 | 0 | 3 | 0 | 3 |
|---|---|---|---|---|
| 2 | 1 | 0 | 0 | 0 |
| 3 | 0 | 2 | 0 | 2 |
| 0 | 0 | 0 | 1 | 0 |
| 3 | 0 | 2 | 0 | 3 |

WEIGHTED IMAGE (B)

(A) A CASE THAT FILLING STATE OF PIXELS ON HIGH-RESOLUTION IMAGE SPACE IS BAD

ASSISTANCE IMAGE (HIGH-RESOLUTION GRID IMAGE)

ASSISTANCE IMAGE (SIMPLIFIED INTERPOLATION IMAGE)

(B) A CASE THAT FILLING STATE OF PIXELS ON HIGH-RESOLUTION IMAGE SPACE IS GOOD

ASSISTANCE IMAGE (HIGH-RESOLUTION GRID IMAGE)

ASSISTANCE IMAGE (SIMPLIFIED INTERPOLATION IMAGE)

(A) BASIS IMAGE (B) DEFORMED IMAGE SUCCESSFUL IN REGISTRATION (C) DEFORMED IMAGE FAILING IN REGISTRATION

IMAGE PROCESSING APPARATUS

TECHNICAL FIELD

The present invention relates to digital image processing technology, and in particular to an image processing apparatus that is used for low-resolution image set acquisition assistance in generating a high-resolution image based on registration of a plurality of low-resolution images.

BACKGROUND ART

Recently, in digital image processing technical field, digital image processing techniques referred to as "super-resolution processing" that generates a high-resolution image by using a plurality of low-resolution images (hereinafter, also simply referred to as "a low-resolution image set") have been developed.

As existing super-resolution processing techniques, for example, as disclosed in Patent Document 1 and Patent Document 2, there is an image processing technique that firstly detects sub-pixel displacement amounts between a plurality of low-resolution images and then generates a high-resolution image by registering and synthesizing these a plurality of low-resolution images on a high-resolution image space based on the detected sub-pixel displacement amounts.

THE LIST OF PRIOR ART DOCUMENTS

Patent Documents

Patent Document 1: Japanese Patent No. 4126378
Patent Document 2: PCT International Publication No. WO2004/068862
Patent Document 3: Japanese Patent Application Laid-Open No. 2007-266667
Patent Document 4: PCT International Publication No. WO2004/063991
Patent Document 5: PCT International Publication No. WO2008/102898

Non-Patent Documents

Non-Patent Document 1:
Toda Masato, Tsukada Masato and Inoue Akira, "Super-Resolution Considering Registration Error", FIT (Forum on Information Technology) 2006, I-027, pp. 63-64, 2006

SUMMARY OF THE INVENTION

Problems to be Solved by the Invention

As described above, in generating a high-resolution image by using a plurality of low-resolution images and by using the above-described existing super-resolution processing techniques, it is necessary to register these plurality of low-resolution images on the high-resolution image space based on the displacement amounts between a plurality of low-resolution images.

In this case, due to influences of motions of objects, the number of low-resolution images to be used, motion estimation processing, pixel selection processing and so on, pixel density on the high-resolution image space after registering a plurality of low-resolution images becomes uneven. With respect to image data having such an uneven pixel density, interpolation processing is performed.

However, since the interpolation processing fills lacking pixels on the high-resolution image space with estimated values, high-resolutionization based on the interpolation processing is not always correct.

Therefore, in generating a high-resolution image by using a plurality of low-resolution images, that is to say, in generating a high-resolution image by the super-resolution processing based on a plurality of low-resolution images, it is preferred to acquire a plurality of low-resolution images (a low-resolution image set) so that the pixel density on the high-resolution image space after registering a plurality of low-resolution images becomes nearly equable.

In this way, to generate a high-resolution image by the super-resolution processing, although users have to acquire a plurality of low-resolution images having sub-pixel displacements, a problem that users cannot know whether optimal low-resolution images for the super-resolution processing are sufficiently obtained or not, exists.

On the other hand, in Patent Document 3, "mobile device with camera, method for controlling the same and method for photographing assistance" that provides user's camera operation assistance so as to become a proper amount of shooting, in generating a synthesized image by using images taken by users and based on a mosaicing processing or the super-resolution processing, is disclosed.

In the Patent Document 3, although providing user's camera operation assistance by showing users the proper amount of shooting, it does not show users a proper sub-pixel amount of shooting.

The present invention has been developed in view of the above-described circumstances, and an object of the present invention is to provide an image processing apparatus for aiding that users acquire an optimal low-resolution image set for super-resolution processing in generating a high-resolution image by using a plurality of low-resolution images and by means of the super-resolution processing.

Means for Solving the Problems

The present invention relates to an image processing apparatus for aiding that a user acquires an optimal low-resolution image set for a super-resolution processing in generating a high-resolution image by using a plurality of low-resolution images and by means of said super-resolution processing. The above-described object of the present invention is achieved by that comprising: an image input unit for inputting said plurality of low-resolution images; a basis image selecting unit for selecting a basis image from said plurality of low-resolution images that are inputted; a reference image selecting unit for selecting a plurality of reference images to be used in said super-resolution processing from said plurality of low-resolution images that are inputted; a displacement amount computing unit for computing a displacement amount for performing registration on a high-resolution image space between said basis image and said each reference image; a deformed image generating unit for generating a plurality of deformed images based on said displacement amounts, said basis image and said plurality of reference image; a composed image and weighted image generating unit for generating composed images and weighted images based on said displacement amounts, said basis image and information about said reference images and said deformed images; a high-resolution grid image generating unit for generating high-resolution grid images by dividing said composed image by said weighted image; an assistance image generating unit for generating assistance images for said user to visually recognize; and an assistance image display unit for displaying said assistance images. Or, it is also possible that said plurality of low-resolution images are images that lack at least one or more kinds of color channel information in pixel information.

Further, the above-described object of the present invention is more effectively achieved by that said assistance image generating unit comprises a resizing processing unit for performing an image resizing processing with respect to said high-resolution grid image. Or, it is more effectively achieved by that said assistance image generating unit comprises a sharpening processing unit for performing an image sharpening processing with respect to said high-resolution grid image. Or, it is more effectively achieved by that said assistance image generating unit comprises a missing pixel enhancement processing unit for performing a missing pixel enhancement processing with respect to said high-resolution grid image. Or, it is more effectively achieved by that said assistance image generating unit comprises an edge image generation processing unit for generating an edge image of said basis image and edge images of said plurality of deformed images with respect to said basis image and said plurality of deformed images. Or, it is more effectively achieved by that said assistance image generating unit comprises an average image generation processing unit for generating an average image with respect to said basis image and said plurality of deformed images.

Moreover, the above-described object of the present invention is more effectively achieved by that said assistance image generating unit comprises an interpolation processing unit for generating an interpolation image by performing a missing pixel interpolation processing with respect to said high-resolution grid image. Or, it is more effectively achieved by that said assistance image generating unit comprises a resizing processing unit for performing an image resizing processing with respect to said interpolation image. Or, it is more effectively achieved by that said assistance image generating unit comprises a sharpening processing unit for performing an image sharpening processing with respect to said interpolation image. Or, it is more effectively achieved by that said assistance image generating unit comprises a saturation enhancement processing unit for performing a saturation enhancement processing with respect to said interpolation image. Or, it is more effectively achieved by that said assistance image generating unit comprises an edge image generation processing unit for generating an edge image of said basis image and edge images of said plurality of deformed images with respect to said basis image and said plurality of deformed images. Or, it is more effectively achieved by that said assistance image generating unit comprises an average image generation processing unit for generating an average image with respect to said basis image and said plurality of deformed images.

Furthermore, the above-described object of the present invention is more effectively achieved by that said image processing apparatus further comprises a parameter setting unit for setting a threshold of a parameter becoming a basis for selecting image information of said reference image; and an external I/F control unit for making a change in said threshold of said parameter of said parameter setting unit in accordance with said user's visual recognition result of said assistance images displayed in said assistance image display unit. Or, it is more effectively achieved by that said image processing apparatus further comprises an external I/F control unit for making a change in number of said plurality of reference images in accordance with said user's visual recognition result of said assistance images displayed in said assistance image display unit. Or, it is more effectively achieved by that said image processing apparatus further comprises an external I/F control unit for making a change in number of said plurality of low-resolution images that are inputted into said image input unit in accordance with said user's visual recognition result of said assistance images displayed in said assistance image display unit. Or, it is more effectively achieved by that said image processing apparatus further comprises an external I/F control unit for performing selection of said reference images in accordance with said user's visual recognition result of said assistance images displayed in said assistance image display unit.

Effects of the Invention

In the present invention, in generating a high-resolution image by using a plurality of low-resolution images and by means of the super-resolution processing, by showing users assistance images generated based on the high-resolution grid image and the simplified interpolation image that are generated on the basis of the composed image and the weighted image that are generated during the super-resolution processing, it becomes possible to provide user assistance (low-resolution image set acquisition assistance) so that users can acquire an optimal low-resolution image set for the super-resolution processing.

Further, in the present invention, in generating a high-resolution image by using a plurality of low-resolution images and by means of the super-resolution processing, by showing users plurality of edge images and an average image that are generated based on a plurality of deformed images (a plurality of reference images that are image-deformed so as to match with the basis image) as the assistance image, it becomes possible to provide user assistance (low-resolution image set acquisition assistance) so that users can acquire an optimal low-resolution image set for the super-resolution processing.

MODE FOR CARRYING OUT THE INVENTION

The present invention relates to an image processing apparatus for aiding that users acquire an optimal low-resolution image set for super-resolution processing in generating a high-resolution image by using a plurality of low-resolution images and by means of the super-resolution processing.

Hereinafter, embodiments of the present invention will be described in detail with reference to the accompanying drawings.

Figure 1:
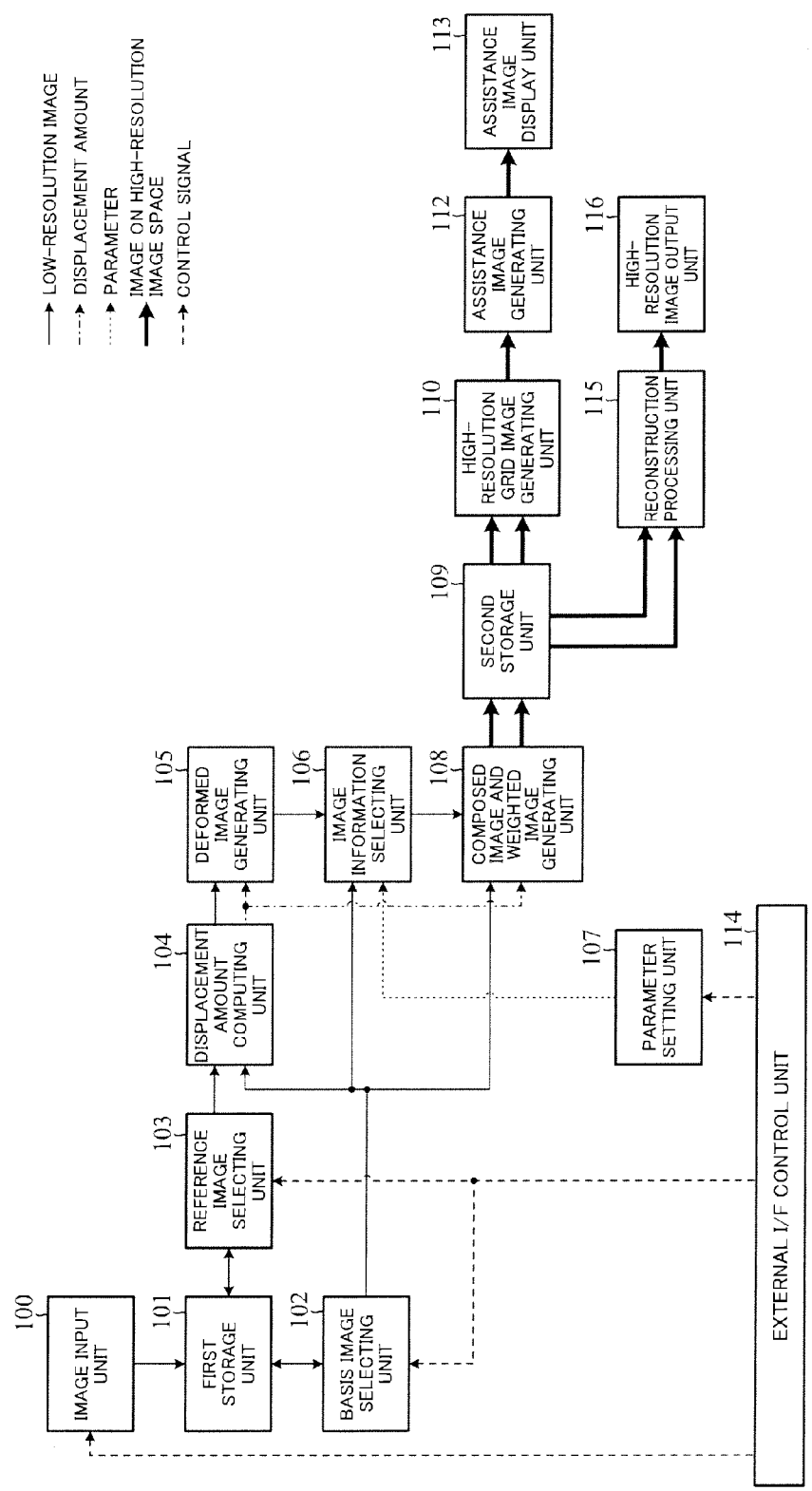
FIG. 1 is a configuration block diagram showing a first embodiment of an image processing apparatus according to the present invention.
Figure 2:
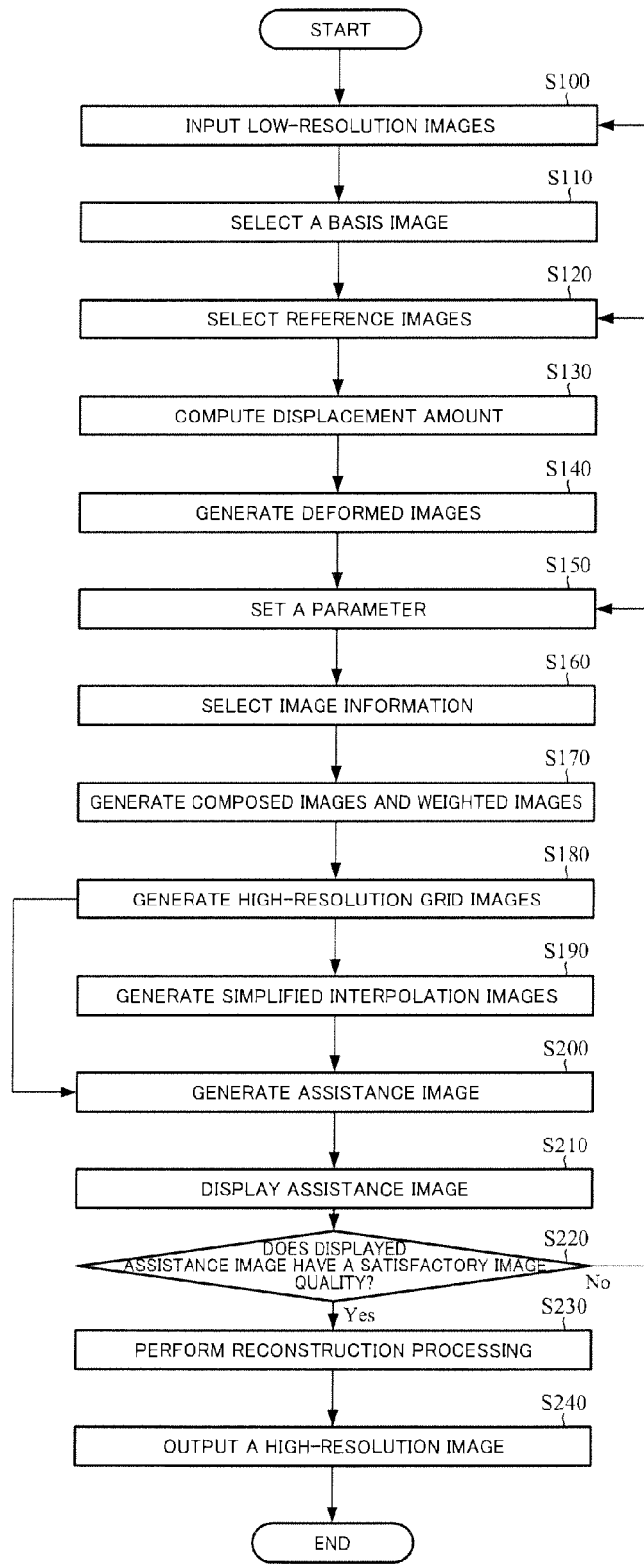
FIG. 2 is a flowchart showing processing flow of the image processing apparatus according to the first embodiment of the present invention shown in FIG. 1.

FIG. 1 is a configuration block diagram showing a first embodiment of an image processing apparatus according to the present invention (hereinafter, also simply referred to as "an image processing apparatus 1 according to the present invention" or an image processing apparatus 1"). Further, FIG. 2 is a flow chart showing processing flow of the image processing apparatus 1 according to the present invention shown in FIG. 1. Hereinafter, the image processing apparatus 1 will be described in detail with reference to FIG. 1 and FIG. 2.

As shown in FIG. 1, the image processing apparatus 1 comprises an image input unit 100, a first storage unit 101, a basis image selecting unit 102, a reference image selecting unit 103, a displacement amount computing unit 104, a deformed image generating unit 105, an image information selecting unit 106, a parameter setting unit 107, a composed image and weighted image generating unit 108, a second storage unit 109, a high-resolution grid image generating unit 110, an assistance image generating unit 112, an assistance image display unit 113, an external I/F control unit 114, a reconstruction processing unit 115 and a high-resolution image output unit 116. Further, in the image processing apparatus 1, the external I/F control unit 114 can control processing in the image input unit 100, the basis image selecting unit 102, the reference image selecting unit 103 and the parameter setting unit 107 by respectively transmitting control signals to the image input unit 100, the basis image selecting unit 102, the reference image selecting unit 103 and the parameter setting unit 107 as necessary.

As shown in FIG. 1, in the image input unit 100, at first, the image input unit 100 inputs a plurality of low-resolution images (see step S100 of FIG. 2). And then, a plurality of low-resolution images inputted into the image input unit 100, are stored in the first storage unit 101. Further, the image input unit 100 can input a given number of low-resolution images selected by users through the external I/F control unit 114 according to selections of users.

Here, in the present invention, as a plurality of low-resolution images inputted into the image input unit 100, it is possible to use images obtained by a three-chip solid-state color imaging device, and it is also possible to use images that are obtained by a single-chip solid-state color imaging device using a color filter and lack at least one or more kinds of color channel information in pixel information. As the color filter, for example, it is possible to use a Bayer color filter.

Next, the basis image selecting unit 102 selects a basis image from a plurality of low-resolution images stored in the first storage unit 101 (see step S110 of FIG. 2). In the present invention, "the basis image" is a low-resolution image high-resolutionized and is also an image becoming a basis in computing displacement amounts in the displacement amount computing unit 104.

In the present invention, the basis image selecting unit 102 selects one low-resolution image that users want to high-resolutionize as the basis image through the external I/F control unit 114. Further, in the present invention, it is also possible that the basis image selecting unit 102 selects one basis image from a plurality of low-resolution images stored in the first storage unit 101 based on a given evaluation basis. As the given evaluation basis, for example, it is possible to use a correlation between images and a focused state.

Next, the reference image selecting unit 103 selects a plurality of reference images used in a high-resolutionization processing (a super-resolution processing) from a plurality of low-resolution images stored in the first storage unit 101 (see step S120 of FIG. 2).

That is to say, the reference image selecting unit 103 selects a given number of reference images from a plurality of low-resolution images stored in the first storage unit 101, and further, users can arbitrarily set the said given number through the external I/F control unit 114.

Next, the displacement amount computing unit 104 respectively computes a position relation between the basis image selected by the basis image selecting unit 102 and each reference image selected by the reference image selecting unit 103 by performing a displacement amount computation processing (see step S130 of FIG. 2). Here, the position relation computed by the displacement amount computing unit 104, becomes a displacement amount for performing registration on a high-resolution image space.

In the present invention, in order to perform the registration on the high-resolution image space, it is necessary to compute a sub-pixel displacement amount between the basis image and each reference image. As concrete examples of the displacement amount computation processing performed in the displacement amount computing unit 104, for example, it is possible to preliminarily enlarge the basis image and each reference image by an interpolation processing (for example, an interpolation processing base on a bicubic method) and then compute the sub-pixel displacement amount between the enlarged basis image and enlarged each reference image by a block matching method, and it is also possible to compute by an existing technique disclosed in Patent Document 4.

Moreover, in the displacement amount computing unit 104, in computing the sub-pixel displacement amount from the low-resolution image, it is necessary to convert the computed sub-pixel displacement amount to a sub-pixel displacement amount on the high-resolution image space.

In other words, the displacement amount computed by the displacement amount computing unit 104 becomes the sub-pixel displacement amount on the high-resolution image space.

Next, the deformed image generating unit 105 generates a plurality of deformed images by respectively performing an image deformation with respect to each reference image based on the displacement amount computed by the displacement amount computing unit 104 by performing a deformed image generation processing (see step S140 of FIG. 2) so as to match with the basis image.

Moreover, in the deformed image generating unit 105, in order to generate the deformed image, it is also possible to generate a plurality of deformed images by performing the image deformation with respect to the basis image based on the displacement amount computed by the displacement amount computing unit 104 so as to respectively match with each reference image.

Next, the parameter setting unit 107 sets a threshold of a parameter for determining whether utilizing the pixel of the reference image in the super-resolution processing or not by performing a parameter setting processing (see step S150 of FIG. 2). As the said parameter, it is possible to use a similarity or dissimilarity between images. Further, users can arbitrarily set the threshold of the said parameter through the external I/F control unit 114.

Here, concrete examples of the parameter used in the present invention will be described.

As an example, setting an SSD (Sum of Squared Difference) obtained with respect to pixels that the position of the basis image corresponds to the position of the deformed image (for example, the reference image performed by the image deformation) as the parameter.

As the parameter, in the case of using the SSD (Sum of Squared Difference) obtained with respect to each pixel, the parameter setting unit 107 sets a threshold of the SSD between the basis image and the deformed image that is obtained with respect to each pixel. In an image information selection processing performed by the image information selecting unit 106 described below, if the SSD between the basis image and the deformed image that is obtained with respect to each pixel is less than or equal to the threshold that is set, selecting the pixel of the reference image as a pixel utilized in the super-resolution processing.

Of course, in the present invention, the parameter is not limited to the SSD between the basis image and the deformed image that is obtained with respect to each pixel, and it is also possible to use an SSD obtained with respect to each frame or each region that the position of the basis image corresponds to the position of the deformed image as the parameter.

Further, in the present invention, not only the SSD but also a known similarity or dissimilarity such as an SAD (Sum of absolute Difference) or an NCC (Normalized Cross-Correlation) can be used as the parameter.

In the present invention, in the case of setting a luminance value of the basis image at a position (i,j) as T(i,j) and setting a luminance value of the deformed image (for example, the reference image that the image deformation is performed so as to match with the basis image) as I(i,j), the SSD, the SAD and the NCC between the basis image having a region of M pixels×N pixels and the deformed image can be obtained based on the following Expression 1, Expression 2 and Expression 3, respectively.

$$SSD = \sum_{j=0}^{N-1} \sum_{i=0}^{M-1} (I(i,j) - T(i,j))^2 \quad \text{(Expression 1)}$$

$$SAD = \sum_{j=0}^{N-1} \sum_{i=0}^{M-1} |I(i,j) - T(i,j)| \quad \text{(Expression 2)}$$

$$NCC = \frac{\sum_{j=0}^{N-1} \sum_{i=0}^{M-1} I(i,j)T(i,j)}{\sqrt{\sum_{j=0}^{N-1} \sum_{i=0}^{M-1} I(i,j)^2 \times \sum_{j=0}^{N-1} \sum_{i=0}^{M-1} T(i,j)^2}} \quad \text{(Expression 3)}$$

The more the SSD and the SAD are small values, the more that image information becomes image information that is desirable for the super-resolution processing. Further, The more the NCC is a large value, the more that image information becomes image information that is desirable for the super-resolution processing.

That is to say, in the present invention, in the case of using the SSD between the basis image and the deformed image as the parameter, in the image information selection processing performed by the image information selecting unit 106 described below, if the SSD between the basis image and the deformed image that is obtained with respect to each pixel is less than or equal to the threshold of the SSD that is set by the parameter setting unit 107, selecting the pixel of the reference image as a pixel utilized in the super-resolution processing.

Further, in the present invention, in the case of using the SAD between the basis image and the deformed image as the parameter, in the image information selection processing performed by the image information selecting unit 106 described below, if the SAD between the basis image and the deformed image that is obtained with respect to each pixel is less than or equal to the threshold of the SAD that is set by the parameter setting unit 107, selecting the pixel of the reference image as a pixel utilized in the super-resolution processing.

And then, in the present invention, in the case of using the NCC between the basis image and the deformed image as the parameter, in the image information selection processing performed by the image information selecting unit 106 described below, if the NCC between the basis image and the deformed image that is obtained with respect to each pixel is more than or equal to the threshold of the NCC that is set by the parameter setting unit 107, selecting the pixel of the reference image as a pixel utilized in the super-resolution processing.

Moreover, in the present invention, not only the similarity or dissimilarity between images but also for example, a basis based on a deformed amount of the above-described I(i,j) disclosed in known background arts such as Non-Patent Document 1 and Patent Document 5 can be used as the parameter.

Next, the image information selecting unit 106 selects image information utilized in the super-resolution processing from a plurality of reference images based on the threshold of the parameter that is set by the parameter setting unit 107, the basis image selected by the basis image selecting unit 102 and a plurality of deformed images generated by the deformed image generating unit 105 by performing an image information selection processing (see step S160 of FIG. 2).

Here, one concrete example of the image information selection processing performed by the image information selecting unit 106 in the case of using the SSD between the basis image and the deformed image as the parameter, will be described.

The image information selecting unit 106 firstly computes the SSD between the basis image and the deformed image for each pixel, and then selects the image information (a plurality of pixels) utilized in the super-resolution processing from a plurality of reference images so that if the computed SSD is less than or equal to the threshold of the SSD that is set by the parameter setting unit 107, selecting the pixel of the reference image existing at that pixel position as a pixel utilized in the super-resolution processing, and on the other hand, if the computed SSD is more than the threshold of the SSD that is set by the parameter setting unit 107, not selecting the pixel of the reference image existing at that pixel position as a pixel utilized in the super-resolution processing.

In other words, as image information utilized in the super-resolution processing, the image information selected by the image information selecting unit 106 is image formation that is comprised of a plurality of pixels selected from a plurality of reference images. That is to say, the image information selected by the image information selecting unit 106 is a plurality of pixels selected from a plurality of reference images.

Next, the composed image and weighted image generating unit 108 generates composed images and weighted images based on the basis image selected by the basis image selecting unit 102, the displacement amount computed by the displacement amount computing unit 104 and the image information selected by the image information selecting unit 106 (see step S170 of FIG. 2). The composed images and the weighted images that are generated by the composed image and weighted image generating unit 108, are stored in the second storage unit.

Figure 3:
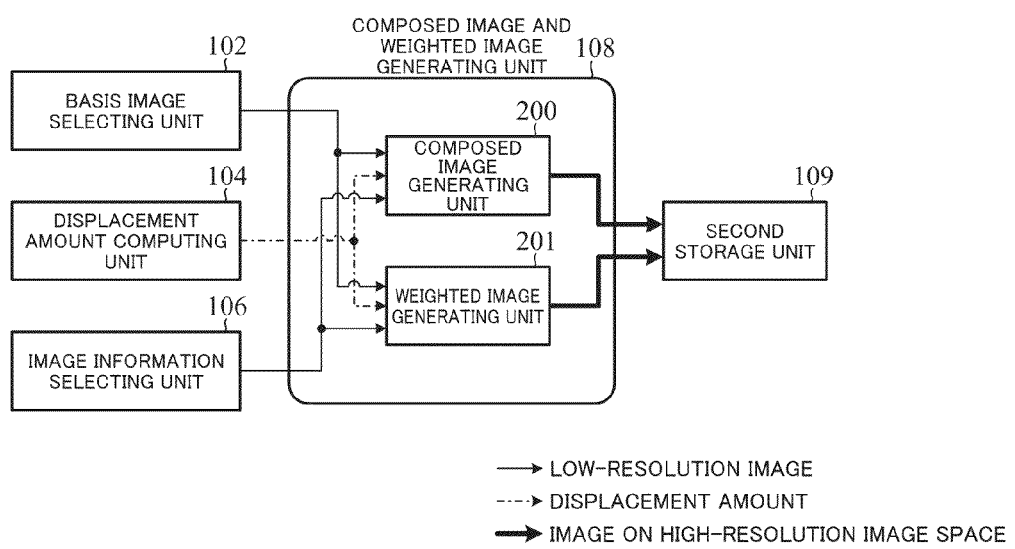
FIG. 3 is a configuration block diagram showing an embodiment of a composed image and weighted image generating unit of the image processing apparatus according to the present invention.

Here, an embodiment of the composed image and weighted image generating unit 108 will be described in detail. FIG. 3 is a configuration block diagram showing the embodiment of the composed image and weighted image generating unit (the composed image and weighted image generating unit 108) of the image processing apparatus according to the present invention.

As shown in FIG. 3, the composed image and weighted image generating unit 108 comprises a composed image generating unit 200 for generating the composed image and a weighted image generating unit 201 for generating the weighted image.

In the composed image and weighted image generating unit 108, at first, the composed image generating unit 200 generates the composed image by arranging each pixel of the selected image information on the high-resolution image space based on the basis image selected by the basis image selecting unit 102, the displacement amount computed by the displacement amount computing unit 104 (i.e. the sub-pixel displacement amount on the high-resolution image space) and the image information selected from a plurality of reference images by the image information selecting unit 106. In addition, the number of pixels of the composed image is equal to the number of pixels of the high-resolution image space.

Next, the weighted image generating unit 201 generates the weighted image by weighting each pixel of the selected image information and arranging weights corresponding to each pixel on the high-resolution image space based on the basis image selected by the basis image selecting unit 102, the displacement amount computed by the displacement amount computing unit 104 and the image information selected from a plurality of reference images by the image information selecting unit 106. In addition, the number of pixels of the weighted image is equal to the number of pixels of the high-resolution image space.

With respect to weighting each pixel of the selected image information that is performed in the weighted image generating unit 201, it is possible to determine a reliability of the displacement amount by evaluating the correlation of pixels corresponding to each other once again based on the displacement amount computed by the displacement amount computing unit 104 for every pixel and set a weight of 0~1 in accordance with the determined reliability, and further it is also possible to weight each pixel of the selected image information in accordance with an imaging time from the basis image becoming the basis of the registration.

Moreover, in the composed image generating unit 200, in arranging pixels of the selected image information on the high-resolution image space, in the case that other pixels are already arranged at the same position (the same pixel position) on the high-resolution image space, accumulatively adding the pixel value of the said pixel to pixel values of those pixels.

Further, in the weighted image generating unit 201, in arranging weights corresponding to pixels of the selected image information on the high-resolution image space, in the case that weights corresponding to other pixels are already arranged at the same position (the same pixel position) on the high-resolution image space, accumulatively adding the weight corresponding to the said pixel to weights corresponding to those pixels.

In this way, the composed images and the weighted images that are generated in the composed image and weighted image generating unit 108, become unequal images that defined pixels that the pixel value is determined and undefined pixels that the pixel value is not determined mix from a relation among the number of low-resolution images used, the number of pixels of the high-resolution image space that the registration is performed, weights corresponding to pixels of the selected image information, motions of objects and so on.

In the above-described embodiment of the composed image and weighted image generating unit 108, in generating the composed images and the weighted images, although accumulatively adding the pixel value and the weight respectively, the composed image and weighted image generating unit of the image processing apparatus according to the present invention is not limited to the above-described embodiment, for example, in arranging the pixel value and the weight on the high-resolution image space, in the case that the pixel value or the weight is already arranged at the same pixel position, it is also possible to generate the composed images and the weighted images without accumulatively adding and by abandoning the said pixel value and the said weight.

Figure 4:
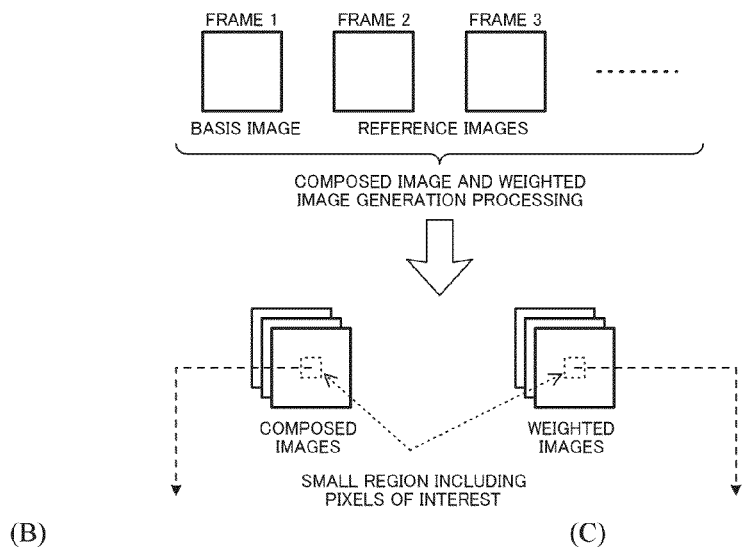
FIG. 4 is a conceptual diagram for illustrating composed images and weighted images in the case that a plurality of low-resolution images inputted into an image input unit of the image processing apparatus according to the present invention are images obtained by a three-chip solid-state color imaging device.
Figure 4:
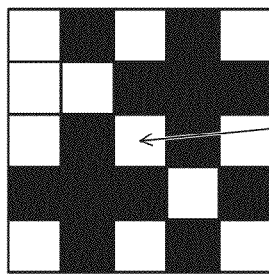
Figure 4:
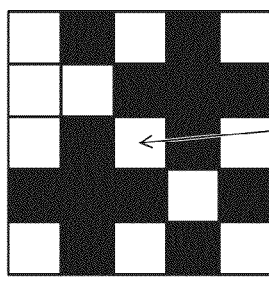
Figure 4:
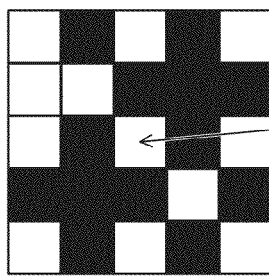

FIG. 4 is a conceptual diagram for illustrating the composed images and the weighted images that are generated by the composed image and weighted image generating unit 108 in the case that a plurality of low-resolution images inputted into the image input unit of the image processing apparatus according to the present invention are images obtained by a three-chip solid-state color imaging device.

As shown in FIG. 4, in the case that a plurality of low-resolution images that are inputted into the image input unit 100 and stored in the first storage unit 101 are images obtained by the three-chip solid-state color imaging device, for example, the basis image selecting unit 102 selects frame 1 as the basis image, and then the reference image selecting unit 103 selects other frames (frame 2, frame 3, . . . ) as the reference images.

And then, based on the basis image (frame 1) selected by the basis image selecting unit 102, the sub-pixel displacement amount on the high-resolution image space computed by the displacement amount computing unit 104 and the image information selected by the image information selecting unit 106, the composed image and weighted image generating unit 108 generates the composed images and the weighted images. For convenience of explanation, FIG. 4 conceptually illustrates the composed images and the weighted images that are generated with respect to a small region including a certain pixel of interest.

As shown in FIG. 4, the generated composed images are divided into a composed image (R) being a R component image, a composed image (G) being a G component image and a composed image (B) being a B component image, and the generated weighted images are divided into a weighted image (R) being a R component image, a weighted image (G) being a G component image and a weighted image (B) being a B component image.

And then, it is clear from FIG. 4 that in the case that a plurality of low-resolution images inputted into the image input unit 100 are images obtained by the three-chip solid-state color imaging device, positions of defined pixels in the composed image and the weighted image are the same in the R component image, the G component image and the B component image.

Figure 5:
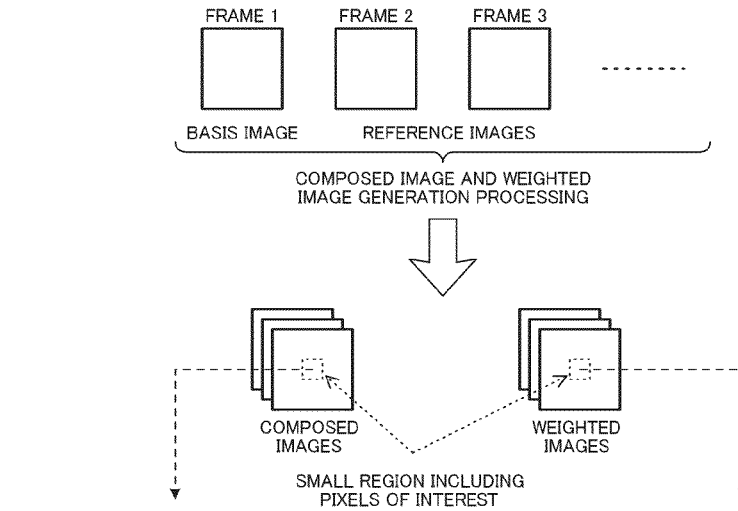
FIG. 5 is a conceptual diagram for illustrating composed images and weighted images in the case that a plurality of low-resolution images inputted into the image input unit of the image processing apparatus according to the present invention are images obtained by a single-chip solid-state color imaging device using a Bayer color filter.
Figure 5:
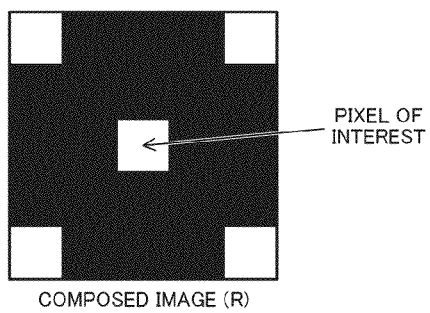
Figure 5:
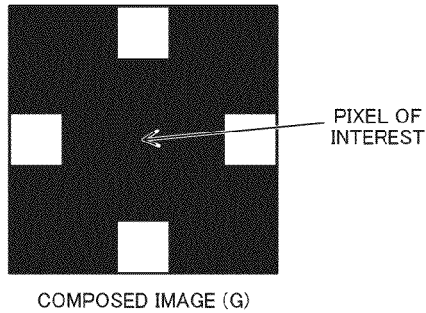
Figure 5:
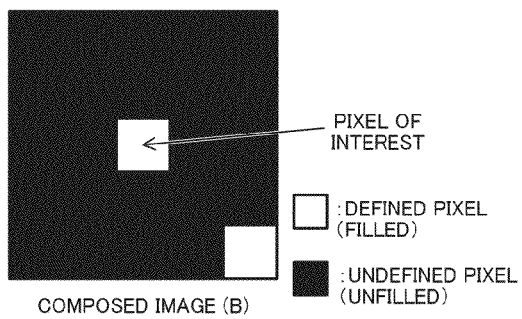

FIG. 5 is a conceptual diagram for illustrating the composed images and the weighted images that are generated by the composed image and weighted image generating unit 108 in the case that a plurality of low-resolution images inputted into the image input unit of the image processing apparatus according to the present invention are images that are obtained by a single-chip solid-state color imaging device using a color filter and lack the color channel.

As shown in FIG. 5, in the case that a plurality of low-resolution images that are inputted into the image input unit 100 and stored in the first storage unit 101 are images obtained by the single-chip solid-state color imaging device, for example, the basis image selecting unit 102 selects frame 1 as the basis image, and then the reference image selecting unit 103 selects other frames (frame 2, frame 3, . . . ) as the reference images.

And then, based on the basis image (frame 1) selected by the basis image selecting unit 102, the sub-pixel displacement amount on the high-resolution image space computed by the displacement amount computing unit 104 and the image information selected by the image information selecting unit 106, the composed image and weighted image generating unit 108 generates the composed images and the weighted images. For convenience of explanation, FIG. 5 conceptually illustrates the composed images and the weighted images that are generated with respect to a small region including a certain pixel of interest.

As shown in FIG. 5, the generated composed images are divided into a composed image (R) being a R component image, a composed image (G) being a G component image and a composed image (B) being a B component image, and the generated weighted images are divided into a weighted image (R) being a R component image, a weighted image (G) being a G component image and a weighted image (B) being a B component image.

And then, it is clear from FIG. 5 that in the case that a plurality of low-resolution images inputted into the image input unit 100 are images that are obtained by the single-chip solid-state color imaging device using a Bayer color filter and lack the color channel, positions of defined pixels in the composed image and the weighted image are different in the R component image, the G component image and the B component image.

Next, the high-resolution grid image generating unit 110 reads out the composed images and the weighted images that are stored in the second storage unit 109 and generates high-resolution grid images by dividing the composed image that is read out by the weighted image that is read out (see step S180 of FIG. 2).

Moreover, in the high-resolution grid image generating unit 110, in generating the high-resolution grid image, in the case that the undefined pixel (i.e. the pixel that the pixel value is zero) exists in the weighted image, since a division by zero occurs, without dividing the composed image by the weighted image, generating the high-resolution grid image by directly setting the pixel value of the high-resolution grid image existing the pixel position of the undefined pixel of the weighted image to zero.

Figure 6:
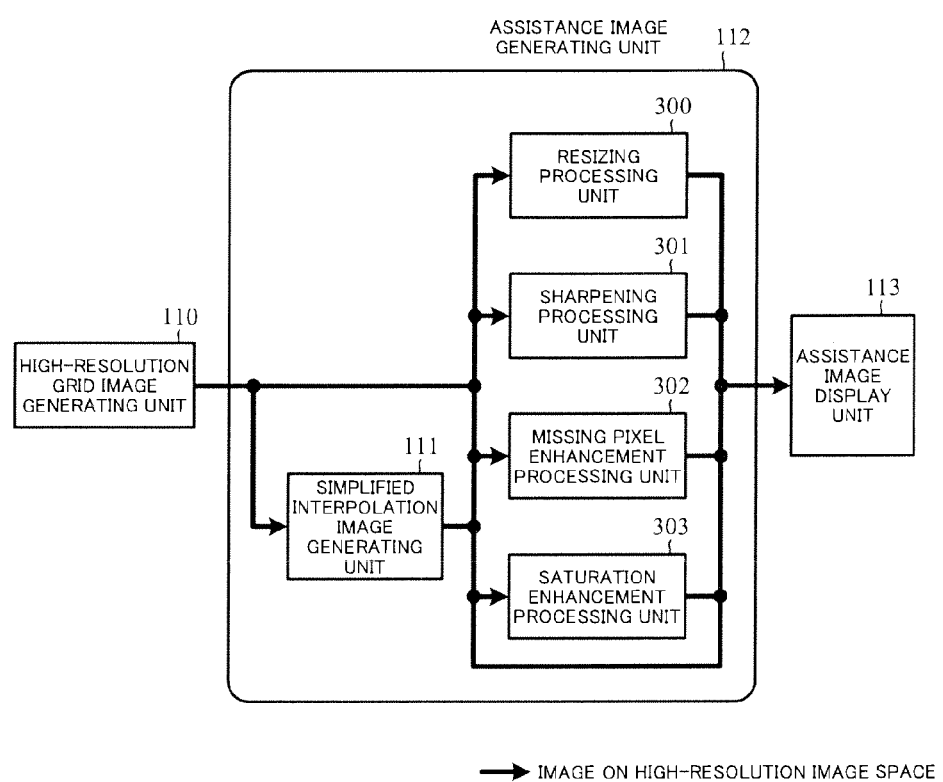
FIG. 6 is a configuration block diagram showing a first embodiment of an assistance image generating unit of the image processing apparatus according to the present invention.

Next, a simplified interpolation image generating unit 111 in the image characteristic amount computing unit 112 shown in FIG. 6, generates simplified interpolation images by performing a simplified interpolation image generation processing (see step S190 of FIG. 2) with respect to the high-resolution grid images generated by the high-resolution grid image generating unit 110.

The simplified interpolation image generation processing performed by the simplified interpolation image generating unit 111, means performing a simple interpolation processing that false color artifacts are easy to appear with respect to pixels that the pixel value of the high-resolution grid image is zero (hereinafter, also simply referred to as "missing pixels of the high-resolution grid image"). Here, the interpolation processing used in the simplified interpolation image generation processing, utilizes a bilinear interpolation processing. Moreover, the interpolation processing used in the simplified interpolation image generation processing is not limited to the bilinear interpolation processing, and for example, it is also possible to use existing interpolation processing methods such as a nearest neighbor method and a bicubic method.

Furthermore, although not shown in FIG. 1, it is also possible that the simplified interpolation image generating unit 111 interpolates by using pixel values of positions that accord with missing pixels of the high-resolution grid image in an image obtained by enlarging the basis image transmitted from the basis image selecting unit 102 on the high-resolution image space by the above-described interpolation processing.

Moreover, in the case that the high-resolution grid image is generated from the composed image and the weighted image that are generated based on a plurality of low-resolution images inputted into the image input unit of the image processing apparatus according to the present invention that are images that are obtained by the single-chip solid-state color imaging device using a color filter and lack the color channel, with respect to such missing pixels of the high-resolution grid image, when performing the simple interpolation processing by the simplified interpolation image generating unit 111, due to errors of interpolated values, in the generated simplified interpolation image, color balance of R, G and B colors collapses, and false color artifacts occur.

FIG. 6 is a configuration block diagram showing a first embodiment of an assistance image generating unit (the assistance image generating unit 112) of the image processing apparatus according to the present invention.

As shown in FIG. 6, the assistance image generating unit 112 comprises a simplified interpolation image generating unit 111 for generating the simplified interpolation image, a resizing processing unit 300 for performing an image resizing processing (for example, an enlargement processing), a sharpening processing unit 301 for performing an image sharpening processing, a missing pixel enhancement processing unit 302 for performing an enhancement processing with respect to missing pixels of the image and a saturation enhancement processing unit 303 for performing a saturation enhancement processing so that false color artifacts existing in the image become noticeable, and generates assistance images by performing an assistance image generation processing that is mainly performed for enhancing user's visual recognizability (see step S200 of FIG. 2) with respect to the high-resolution grid image generated by the high-resolution grid image generating unit 110 and the simplified interpolation image.

That is to say, the assistance images generated by the assistance image generating unit 112 means the high-resolution grid image and the simplified interpolation image that the assistance image generation processing is performed. And then, the assistance images generated by the assistance image generating unit 112 are displayed in the assistance image display unit 113.

In the assistance image generating unit 112, the resizing processing unit 300 performs the image resizing processing (for example, the enlargement processing) with respect to the high-resolution grid image and the simplified interpolation image. Further, the sharpening processing unit 301 performs the image sharpening processing with respect to the high-resolution grid image and the simplified interpolation image.

Moreover, the missing pixel enhancement processing unit 302 performs the enhancement processing with respect to missing pixels of the high-resolution grid image. As one concrete example, for example, by performing a morphological opening processing with respect to missing pixels of the high-resolution grid image, the enhancement processing of missing pixels of the high-resolution grid image is performed.

Furthermore, the saturation enhancement processing unit 303 performs the saturation enhancement processing with respect to the simplified interpolation image so that false color artifacts existing in the simplified interpolation image become noticeable.

The assistance image generation processing performed in the assistance image generating unit 112 means at least one or more image processes of an image processing performed in the resizing processing unit 300, an image processing performed in the sharpening processing unit 301, an image processing performed in the missing pixel enhancement processing unit 302 and an image processing performed in the saturation enhancement processing unit 303.

Concretely, for example, it is also possible that in the assistance image generating unit 112, by carrying out the image processing performed in the resizing processing unit 300 with respect to the high-resolution grid image and the simplified interpolation image, generating the assistance images.

Further, it is also possible that in the assistance image generating unit 112, by carrying out the image processing performed in the sharpening processing unit 301 with respect to the high-resolution grid image and the simplified interpolation image, generating the assistance images.

Moreover, it is also possible that in the assistance image generating unit 112, by carrying out the image processing performed in the resizing processing unit 300 and the image processing performed in the sharpening processing unit 301 with respect to the high-resolution grid image and the simplified interpolation image, generating the assistance images.

Furthermore, it is also possible that in the assistance image generating unit 112, by firstly carrying out the image processing performed in the resizing processing unit 300 and the image processing performed in the sharpening processing unit 301 with respect to the high-resolution grid image and the simplified interpolation image, and then carrying out the image processing performed in the missing pixel enhancement processing unit 302 with respect to the high-resolution grid image, and simultaneously carrying out the image processing performed in the saturation enhancement processing unit 303 with respect to the simplified interpolation image, generating the assistance images.

Further, it is also possible that in the assistance image generating unit 112, by carrying out the image processing performed in the missing pixel enhancement processing unit 302 with respect to the high-resolution grid image and simultaneously carrying out the image processing performed in the saturation enhancement processing unit 303 with respect to the simplified interpolation image, generating the assistance images.

Further, it is also possible that in the assistance image generating unit 112, by firstly carrying out the image processing performed in the resizing processing unit 300 with respect to the high-resolution grid image and the simplified interpolation image, and then carrying out the image processing performed in the missing pixel enhancement processing unit 302 with respect to the high-resolution grid image, and simultaneously carrying out the image processing performed in the saturation enhancement processing unit 303 with respect to the simplified interpolation image, generating the assistance images.

Further, it is also possible that in the assistance image generating unit 112, by firstly carrying out the image processing performed in the sharpening processing unit 301 with respect to the high-resolution grid image and the simplified interpolation image, and then carrying out the image processing performed in the missing pixel enhancement processing unit 302 with respect to the high-resolution grid image, and simultaneously carrying out the image processing performed in the saturation enhancement processing unit 303 with respect to the simplified interpolation image, generating the assistance images.

Furthermore, although not shown in FIG. 1, it is also possible that with respect to the high-resolution grid image generated in the high-resolution grid image generating unit 110 and the simplified interpolation image generated in the simplified interpolation image generating unit 111, no processing is carried out, and just directly displaying the high-resolution grid image and the simplified interpolation image in the assistance image display unit 113.

Next, the assistance image display unit 113 displays the assistance images (the high-resolution grid image and the simplified interpolation image that the assistance image generation processing is performed) generated in the assistance image generating unit 112 (see step S210 of FIG. 2). Moreover, it is also possible that the assistance image display unit 113 displays the high-resolution grid image while blinking missing pixels of the high-resolution grid image as the assistance image.

Since a user visually recognizes the assistance images displayed in the assistance image display unit 113, the user can understand whether a plurality of reference images being enough for the super-resolution processing that completely satisfactory image quality of the user is obtained, are selected or not (see step S220 of FIG. 2).

Figure 7:
FIG. 7 shows examples of assistance images displayed in an assistance image display unit in the case that a plurality of low-resolution images inputted into the image input unit of the image processing apparatus according to the present invention are images obtained by a single-chip solid-state color imaging device using a Bayer color filter.
Figure 7:
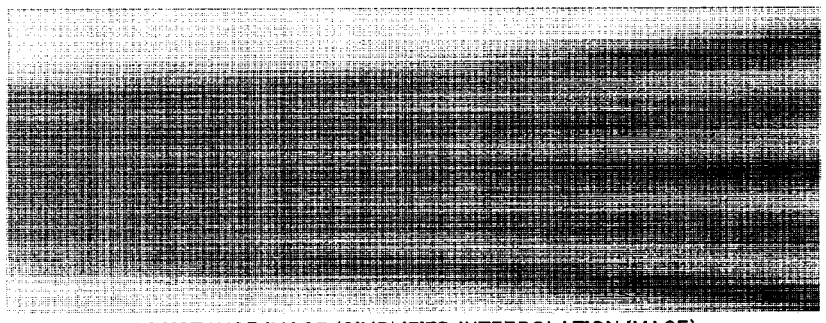
Figure 7:
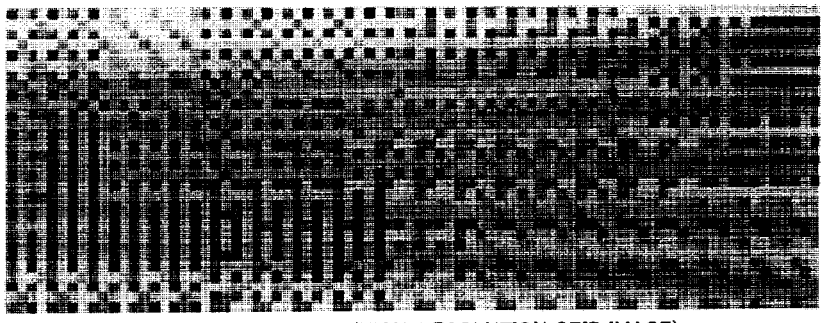
Figure 7:
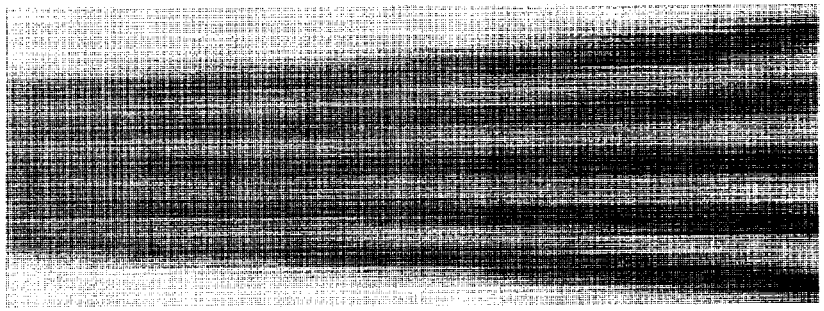

FIG. 7 shows examples of the assistance images displayed in the assistance image display unit 113 in the case that a plurality of low-resolution images inputted into the image input unit of the image processing apparatus according to the present invention are images obtained by a single-chip solid-state color imaging device using a Bayer color filter.

FIG. 7(A) shows examples of the high-resolution grid image and the simplified interpolation image that are used as the assistance image in the case that filling state of pixels on the high-resolution image space is bad, and FIG. 7(B) shows examples of the high-resolution grid image and the simplified interpolation image that are used as the assistance image in the case that filling state of pixels on the high-resolution image space is good.

Since the user visually recognizes the high-resolution grid image as the assistance image shown in FIG. 7, it is possible for the user to confirm the filling state of pixels on the high-resolution image space.

In the present invention, a thing that the filling state of pixels on the high-resolution image space is good, means that there are few missing pixels in the high-resolution grid image. Further, a thing that the filling state of pixels on the high-resolution image space is bad, means that there are many missing pixels in the high-resolution grid image.

Further, since the user visually recognizes the simplified interpolation image as the assistance image shown in FIG. 7, it is possible for the user to observe false color artifacts existing in the simplified interpolation image.

In accordance with user's visual recognition result of the assistance images, the external I/F control unit 114 controls at least one process of the process performed in the parameter setting unit 107, the process performed in the reference image selecting unit 103 and the process performed in the image input unit 100.

That is to say, in the image processing apparatus according to the present invention, in the case that the user determines that a plurality of reference images being enough for the super-resolution processing that completely satisfactory image quality of the user is obtained, are not selected by visually recognizing the assistance images displayed in the assistance image display unit 113 (see "NO" of step S220 of FIG. 2), in accordance with the situation of visually-recognized assistance images, through the external I/F control unit 114, after performing at least one process of a process (1) that processes so as to return to step S150 of FIG. 2 (the parameter setting unit 107) and set the threshold of the parameter again through the user, a process (2) that processes so as to return to step S120 of FIG. 2 (the reference image selecting unit 103) and set the given number of reference images to be selected again through the user, and a process (3) that processes so as to return to step S100 of FIG. 2 (the image input unit 100) and input the given number of low-resolution images selected by the user, subsequent processes are repeated.

Concretely, for example, in the case of determining that the filling state of pixels on the high-resolution image space is bad based on the user's visual recognition of the assistance images, that is to say, in the case of determining that a plurality of reference images being enough for the super-resolution processing that completely satisfactory image quality of the user is obtained, are not selected, through the external I/F control unit 114, the user sets the given number of the reference image selecting unit 103 again so as to increase the given number of reference images, or loosens the threshold of the parameter of the parameter setting unit 107 (for example, in the case of using the SSD as the parameter, enlarging the threshold of the SSD).

Further, in the case of determining that the number of low-resolution images stored in the first storage unit 101 is insufficient based on the user's visual recognition of the assistance images displayed in the assistance image display unit 113, through the external I/F control unit 114, the image input unit 100 inputs the given number of low-resolution images that the given number is set by the user, and then these inputted low-resolution images are stored in the first storage unit 101.

Moreover, in the present invention, in the case of changing the number of reference images that is selected by the user by sequentially storing the composed image and the weighted image that are generated by the composed image and weighted image generating unit 108 in the second storage unit 109, it is possible to reflect the change in the number of reference images by just reading out the composed image and the weighted image from the second storage unit 109.

On the other hand, in the image processing apparatus according to the present invention, in the case that the user determines that a plurality of reference images being enough for the super-resolution processing that completely satisfactory image quality of the user is obtained, are selected by visually recognizing the assistance images displayed in the assistance image display unit 113 (see "YES" of step S220 of FIG. 2), the reconstruction processing unit 115 reads out the composed images and the weighted images that are stored in the second storage unit 109, and generates the high-resolution image by performing a reconstruction processing (see step S230 of FIG. 2) with respect to the composed images and the weighted images that are read out.

The reconstruction processing performed by the reconstruction processing unit 115 uses a reconstruction processing being the existing techniques such as an MAP (Maximum a posteriori) method or color kernel regression.

Finally, the high-resolution image output unit 116 outputs the high-resolution image generated by the reconstruction processing unit 115. And then, the processes performed in the image processing apparatus according to the present invention (the image processing apparatus 1) end.

In the above-described embodiment of the image processing apparatus according to the present invention (the image processing apparatus 1), although the assistance image generating unit 112 generates the assistance images by performing the assistance image generation processing with respect to the high-resolution grid image and the simplified interpolation image, the present invention is not limited to this, for example, it is possible that the assistance image generating unit 112 generates the assistance images by performing the assistance image generation processing only with respect to the high-resolution grid image, and it is also possible that the assistance image generating unit 112 generates the assistance images by performing the assistance image generation processing only with respect to the simplified interpolation image.

Further, in the case that the assistance images generated in the assistance image generating unit 112 are the high-resolution grid image and the simplified interpolation image that the assistance image generation processing is performed, it is also possible that the assistance image display unit 113 displays any one of two assistance images.

In the image processing apparatus 1 of the present invention, by performing the above-described processes, it becomes possible to assist that users acquire the optimal low-resolution image set for the super-resolution processing, that is to say, according to the present invention, since the low-resolution image set that has sub-pixel displacements being necessary for the super-resolution processing is sufficiently obtained, it is possible to generate the high-resolution image with high image quality.

Figure 8:
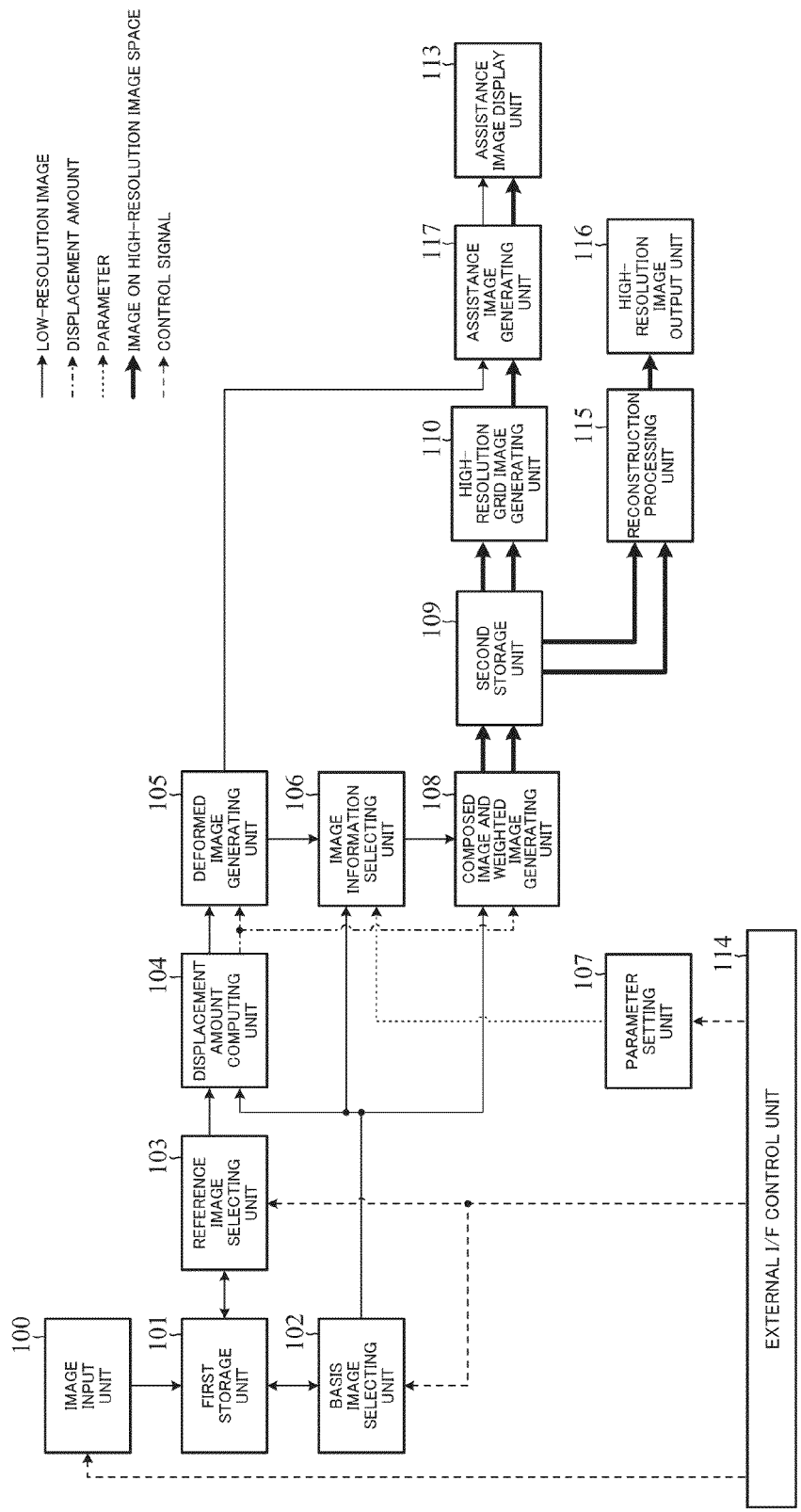
FIG. 8 is a configuration block diagram showing a second embodiment of the image processing apparatus according to the present invention.
Figure 9:
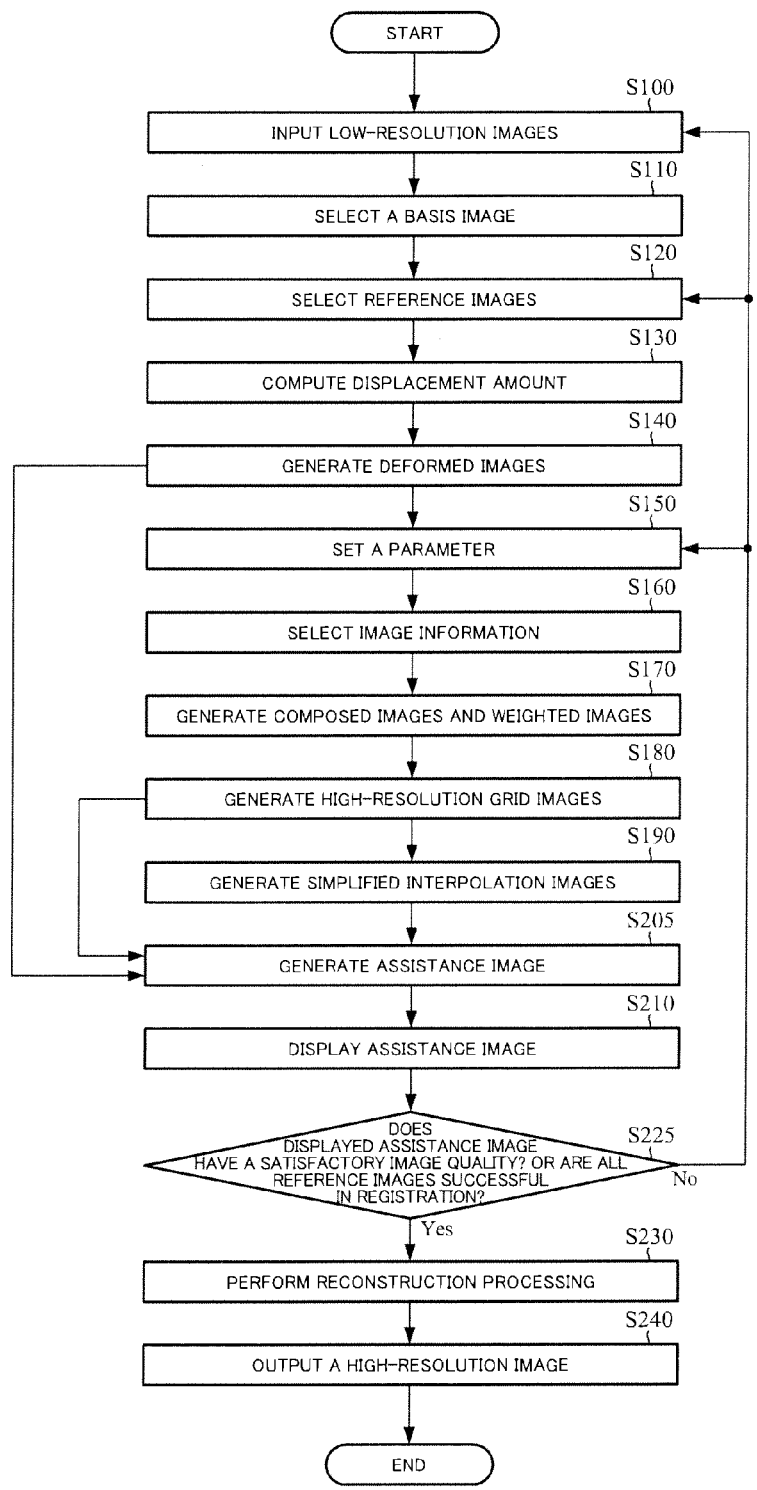
FIG. 9 is a flowchart showing processing flow of the image processing apparatus according to the second embodiment of the present invention shown in FIG. 8.

FIG. 8 is a configuration block diagram showing a second embodiment of the image processing apparatus according to the present invention (hereinafter, also simply referred to as "an image processing apparatus 2 according to the present invention" or "an image processing apparatus 2"). Further, FIG. 9 is a flow chart showing processing flow of the image processing apparatus 2 according to the present invention shown in FIG. 8.

As shown in FIG. 8, the image processing apparatus 2 comprises an image input unit 100, a first storage unit 101, a basis image selecting unit 102, a reference image selecting unit 103, a displacement amount computing unit 104, a deformed image generating unit 105, an image information selecting unit 106, a parameter setting unit 107, a composed image and weighted image generating unit 108, a second storage unit 109, a high-resolution grid image generating unit 110, an assistance image generating unit 117, an assistance image display unit 113, an external I/F control unit 114, a reconstruction processing unit 115 and a high-resolution image output unit 116. Further, in the image processing apparatus 2, the external I/F control unit 114 can control processing in the image input unit 100, the basis image selecting unit 102, the reference image selecting unit 103 and the parameter setting unit 107 by respectively transmitting control signals to the image input unit 100, the basis image selecting unit 102, the reference image selecting unit 103 and the parameter setting unit 107 as necessary.

It is clear from FIG. 1 and FIG. 8 that the image processing apparatus 2 and the image processing apparatus 1 are different only in the assistance image generating unit, i.e., the assistance image generating unit 112 of the image processing apparatus 1 is not connected to the deformed image generating unit 105, meanwhile, the assistance image generating unit 117 of the image processing apparatus 2 is connected to the deformed image generating unit 105.

That is to say, the difference between the image processing apparatus 1 and the image processing apparatus 2 is that the assistance image generation processing (step S200 of FIG. 2) performed in the assistance image generating unit 112 of the image processing apparatus 1 is different from the assistance image generation processing (step S205 of FIG. 9) performed in the assistance image generating unit 117 of the image processing apparatus 2.

Since the image processing apparatus 1 and the image processing apparatus 2 are the same in other processing units except the assistance image generating unit, i.e., in all of the image input unit 100, the first storage unit 101, the basis image selecting unit 102, the reference image selecting unit 103, the displacement amount computing unit 104, the deformed image generating unit 105, the image information selecting unit 106, the parameter setting unit 107, the composed image and weighted image generating unit 108, the second storage unit 109, the high-resolution grid image generating unit 110, the assistance image display unit 113, the external I/F control unit 114, the reconstruction processing unit 115 and the high-resolution image output unit 116 and perform the same processes, descriptions of these processing units of the image processing apparatus 2 are omitted.

Figure 10:
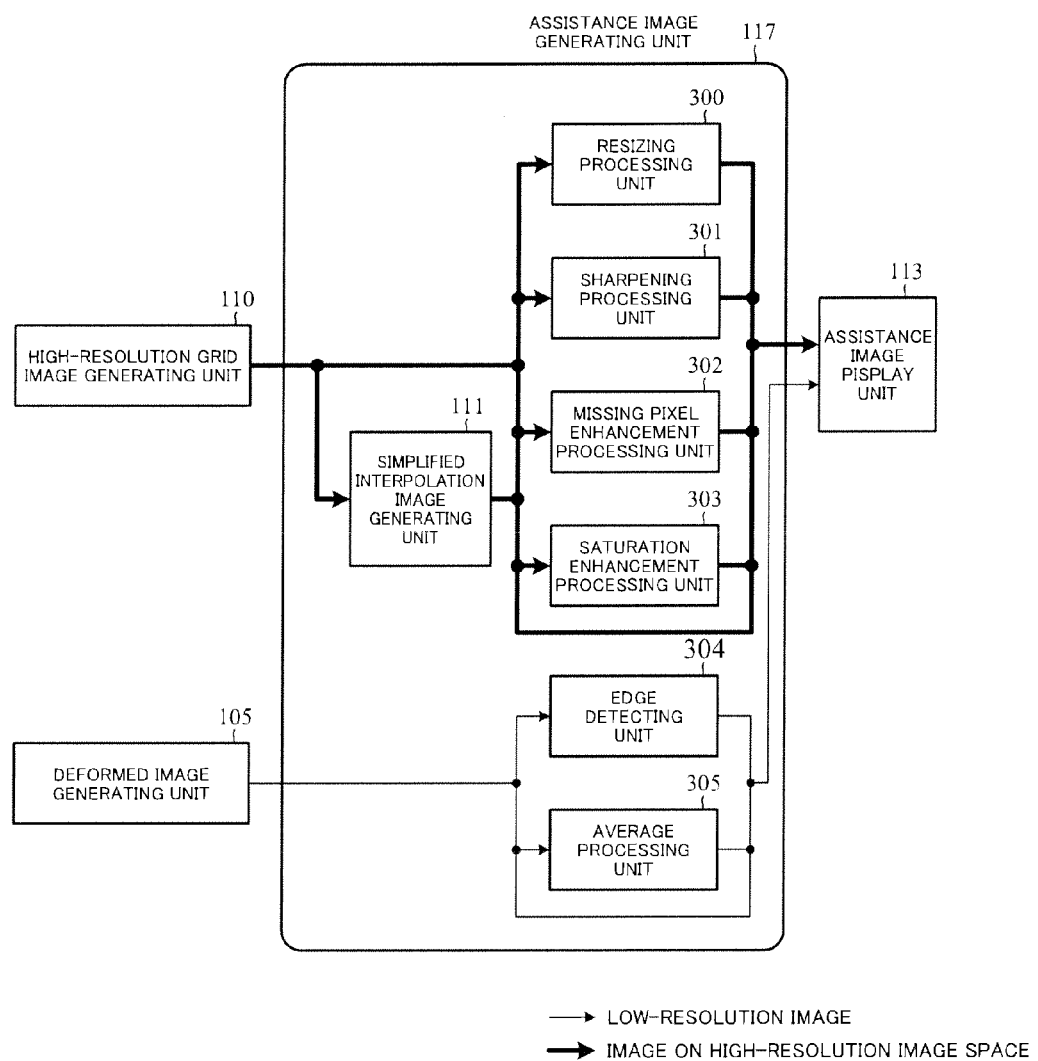
FIG. 10 is a configuration block diagram showing a second embodiment of the assistance image generating unit of the image processing apparatus according to the present invention.

Hereinafter, the assistance image generating unit 117 of the image processing apparatus 2 will be described. FIG. 10 is a configuration block diagram showing a second embodiment of the assistance image generating unit (the assistance image generating unit 117) of the image processing apparatus according to the present invention.

As shown in FIG. 10, the assistance image generating unit 117 comprises a simplified interpolation image generating unit 111 for generating the simplified interpolation image, a resizing processing unit 300 for performing an image resizing processing (for example, an enlargement processing), a sharpening processing unit 301 for performing an image sharpening processing, a undefined pixel enhancement processing unit 302 for performing an enhancement processing with respect to missing pixels of the image, a saturation enhancement processing unit 303 for performing a saturation enhancement processing so that false color artifacts existing in the image become noticeable, an edge detecting unit 304 for performing an edge detection processing of the image and an average processing unit 305 for performing an average processing of a plurality of images, and generates assistance images by performing an assistance image generation processing that is mainly performed for enhancing user's visual recognizability (see step S205 of FIG. 9) with respect to the high-resolution grid image generated by the high-resolution grid image generating unit 110, the simplified interpolation image and a plurality of deformed images generated by the deformed image generating unit 105.

The assistance images generated by the assistance image generating unit 117 means the high-resolution grid image and the simplified interpolation image that the assistance image generation processing is performed, a plurality of edge images generated based on a plurality of deformed images and the average image. And then, the assistance images generated by the assistance image generating unit 117 are displayed in the assistance image display unit 113.

The configuration of the assistance image generating unit 117 shown in FIG. 10 and the configuration of the assistance image generating unit 112 shown in FIG. 6 are different in that the assistance image generating unit 112 does not comprise the edge detecting unit 304 and the average processing unit 305, meanwhile, the assistance image generating unit 117 comprises the edge detecting unit 304 and the average processing unit 305, and the deformed image generating unit 105 is connected to the edge detecting unit 304 and the average processing unit 305.

Since processes in the simplified interpolation image generating unit 111, the resizing processing unit 300, the sharpening processing unit 301, the missing pixel enhancement processing unit 302 and the saturation enhancement processing unit 303 of the assistance image generating unit 117 are the same as processes in the simplified interpolation image generating unit 111, the resizing processing unit 300, the sharpening processing unit 301, the missing pixel enhancement processing unit 302 and the saturation enhancement processing unit 303 of the assistance image generating unit 112, descriptions of these processes are omitted.

That is to say, the assistance image generating unit 117 generates the assistance images (i.e. the high-resolution grid image and the simplified interpolation image that the assistance image generation processing is performed) by performing a processing that is the same as the assistance image generation processing performed by the assistance image generating unit 112 with respect to the high-resolution grid image generated in the high-resolution grid image generating unit 110 and the simplified interpolation image. And then, the assistance images generated by the assistance image generating unit 117 (i.e. the high-resolution grid image and the simplified interpolation image that the assistance image generation processing is performed), are displayed in the assistance image display unit 113.

Figure 11:
FIG. 11 shows examples of deformed images that are generated by a deformed image generating unit of the image processing apparatus according to the present invention.
Figure 11:
Figure 11:

FIG. 11 shows concrete examples of the deformed images that are generated by the deformed image generating unit 105. FIG. 11(A) shows the basis image selected by the basis image selecting unit 102. Further, FIG. 11(B) shows one reference image that is image-deformed so as to match with the basis image shown in FIG. 11(A) (a deformed image successful in the registration), and FIG. 11(C) shows one reference image that is image-deformed so as to match with the basis image shown in FIG. 11(A) (a deformed image failing in the registration).

Hereinafter, for convenience of explanation, the deformed image failing in the registration is also referred to as "a reference image failing in the registration", and the deformed image successful in the registration is also referred to as "a reference image successful in the registration".

In the assistance image generating unit 117, the edge detecting unit 304 generates a plurality of edge images (edge images of deformed images) by performing the edge detection processing with respect to a plurality of deformed images generated by the deformed image generating unit 105 (all reference images that are image-deformed so as to match with the basis image).

Further, it is also possible that the edge detecting unit 304 generates an edge image of the basis image by further performing the edge detection processing with respect to the basis image. That is to say, it may be said that the edge detecting unit 304 is an edge image generation processing unit that generates the edge image of the basis image and edge images of deformed images with respect to the basis image and deformed images.

The assistance image display unit 113 respectively overlay-displays all edge images generated by the edge detecting unit 304 in the basis image. In the assistance image display unit 113, by performing such an overlay display, the visual recognizability that whether each deformed image (each reference image) is successful in the registration or not, is growing.

Further, in the assistance image generating unit 117, the average processing unit 305 generates the average image by adding and averaging a plurality of deformed images generated by the deformed image generating unit 105 (all reference images that are image-deformed so as to match with the basis image). The average image generated by the average processing unit 305 is displayed in the assistance image display unit 113.

Moreover, it is also possible that the average processing unit 305 generates an average image by further adding and averaging the basis image and a plurality of deformed images. That is to say, it may be said that the average processing unit 305 is an average image generation processing unit that generates the average image with respect to the basis image and a plurality of deformed images.

Even in the average processing performed in the average processing unit 305, if a plurality of deformed images are successful in the registration, since without the occurrence of a substantial change in the average image obtained from these deformed images, the user visually recognizes the average image displayed in the assistance image display unit 113, it is possible to easily confirm whether these deformed images (reference images) are successful in the registration or not, and the visual recognizability of success and failure of the registration, is growing.

In the above-described embodiment of the assistance image generating unit 117, although generating a plurality of edge images and the average image as the assistance images by performing the edge detection processing performed in the edge detecting unit 304 and the average processing performed in the average processing unit 305 with respect to all deformed images generated by the deformed image generating unit 105, the assistance image generating unit 117 is not limited to this embodiment, for example, it is possible to generate a plurality of edge images as the assistance images by performing only the edge detection processing performed in the edge detecting unit 304 with respect to all deformed images generated by the deformed image generating unit 105, and it is also possible to generate the average image as the assistance image by performing only the average processing performed in the average processing unit 305 with respect to all deformed images generated by the deformed image generating unit 105.

Moreover, it is also possible that in the assistance image generating unit 117, with respect to all deformed images generated by the deformed image generating unit 105, without performing any processing, just directly displaying all deformed images as the assistance images in the assistance image display unit 113.

In the image processing apparatus 2, in the case that the assistance images displayed in the assistance image display unit 113 are the high-resolution grid image and the simplified interpolation image that the assistance image generation processing is performed, when the user determines that a plurality of reference images being enough for the super-resolution processing that completely satisfactory image quality of the user is obtained, are not selected by visually recognizing the assistance images (see "NO" of step S225 of FIG. 9), performing the same processing as the image processing apparatus 1 (the case of "NO" of step S220 of FIG. 2).

And then, in the image processing apparatus 2, in the case that the assistance images displayed in the assistance image display unit 113 are the high-resolution grid image and the simplified interpolation image that the assistance image generation processing is performed, when the user determines that a plurality of reference images being enough for the super-resolution processing that completely satisfactory image quality of the user is obtained, are selected by visually recognizing the assistance images (see "YES" of step S225 of FIG. 9), performing the same processing as the image processing apparatus 1 (the case of "YES" of step S220 of FIG. 2).

Further, since it is preferred to select only reference images being successful in the registration as the reference images to be used in the super-resolution processing, in the image processing apparatus 2, in the case that the assistance images displayed in the assistance image display unit 113 are a plurality of edge images generated based on a plurality of deformed images and the average image, when the user determines that all reference images are successful in the registration by visually recognizing these assistance images (see "YES" of step S225 of FIG. 9), the reconstruction processing unit 115 reads out the composed images and the weighted images that are stored in the second storage unit 109, and generates the high-resolution image by performing the reconstruction processing (see step S230 of FIG. 2) with respect to the composed images and the weighted images that are read out.

On the other hand, in the image processing apparatus 2, in the case that the assistance images displayed in the assistance image display unit 113 area plurality of edge images generated based on a plurality of deformed images and the average image, when it cannot be said that all reference images are successful in the registration by visually recognizing these assistance images, i.e. when the user determines that reference images failing in the registration exist in a plurality of reference images by visually recognizing these assistance images (see "NO" of step S225 of FIG. 9), through the external I/F control unit 114, returning to step S120 of FIG. 9 (the reference image selecting unit 103), the reference image selection processing is performed so as to select only reference images that the user determines being successful in the registration from a plurality of reference images as the reference image used in the super-resolution processing.

In the image processing apparatus 2 of the present invention, by performing the above-described processes, it becomes possible to assist that users acquire the optimal low-resolution image set for the super-resolution processing, that is to say, according to the present invention, since the low-resolution image set that has sub-pixel displacements being necessary for the super-resolution processing is sufficiently obtained, it is possible to generate the high-resolution image with high image quality.

Moreover, it is possible to apply the image processing apparatus according to the present invention to electronic imaging devices (for example, digital imaging devices such as a single-chip solid-state color imaging device and a three-chip solid-state color imaging device) and image systems.

Further, the image processing apparatus according to the present invention can be implemented in software (computer program) and by using a computer system, and then the image processing apparatus according to the present invention can be also implemented in hardware such as an ASIC (Application Specific Integrated Circuit), a GPU (Graphics Processing Unit) and an FPGA (Field Programmable Gate Array).

EXPLANATION OF REFERENCE NUMERALS 100 image input unit
101 first storage unit
102 basis image selecting unit
103 reference image selecting unit
104 displacement amount computing unit
105 deformed image generating unit
106 image information selecting unit
107 parameter setting unit
108 composed image and weighted image generating unit
109 second storage unit
110 high-resolution grid image generating unit
111 simplified interpolation image generating unit
112, 117 assistance image generating unit
113 assistance image display unit
114 external I/F control unit
115 reconstruction processing unit
116 high-resolution image output unit
200 composed image generating unit
201 weighted image generating unit
300 resizing processing unit
301 sharpening processing unit
302 missing pixel enhancement processing unit
303 saturation enhancement processing unit
304 edge detecting unit
305 average processing unit

The invention claimed is:

1. An image processing apparatus for aiding that a user acquires an optimal low-resolution image set for a super-resolution processing in generating a high-resolution image by using a plurality of low-resolution images and by means of said super-resolution processing, comprising:
    an image input unit for inputting said plurality of low-resolution images;
a basis image selecting unit for selecting a basis image from said plurality of low-resolution images that are inputted;
    a reference image selecting unit for selecting a plurality of reference images to be used in said super-resolution processing from said plurality of low-resolution images that are inputted;
    a displacement amount computing unit for respectively computing a displacement amount for performing registration on a high-resolution image space between said basis image and said each reference image;
    a deformed image generating unit for generating a plurality of deformed images based on said displacement amounts and said plurality of reference image;
    an assistance image generating unit for generating assistance images for said user to visually recognize based on said displacement amounts, said basis image and information about said reference images and said deformed images; and
    an assistance image display unit for displaying said assistance images.

2. An image processing apparatus according to claim 1,
    wherein said image processing apparatus further comprises a high-resolution grid image generating unit for generating high-resolution grid images based on said displacement amounts, said basis image and information about said reference images and said deformed images, and
    wherein said assistance image generating unit comprises a missing pixel enhancement processing unit for performing a missing pixel enhancement processing with respect to said high-resolution grid image.

3. An image processing apparatus according to claim 1, wherein said assistance image generating unit comprises an edge image generation processing unit for generating an edge image of said basis image and edge images of said plurality of deformed images with respect to said basis image and said plurality of deformed images.

4. An image processing apparatus according to claim 1, wherein said assistance image generating unit comprises an average image generation processing unit for generating an average image with respect to said basis image and said plurality of deformed images.

5. An image processing apparatus according to claim 1,
    wherein said image processing apparatus further comprises a high-resolution grid image generating unit for generating high-resolution grid images based on said displacement amounts, said basis image and information about said reference images and said deformed images, and
    wherein said assistance image generating unit comprises an interpolation processing unit for generating an interpolation image by performing a missing pixel interpolation processing with respect to said high-resolution grid image.

6. An image processing apparatus according to claim 5, wherein
    said assistance image generating unit comprises a resizing processing unit for performing an image resizing processing with respect to said interpolation image.

7. An image processing apparatus according to claim 5, wherein
    said assistance image generating unit comprises a sharpening processing unit for performing an image sharpening processing with respect to said interpolation image.

8. An image processing apparatus according to claim 5, wherein
    said assistance image generating unit comprises a saturation enhancement processing unit for performing a saturation enhancement processing with respect to said interpolation image.

9. An image processing apparatus according to claim 5, wherein
    said assistance image generating unit comprises an edge image generation processing unit for generating an edge image of said basis image and edge images of said plurality of deformed images with respect to said basis image and said plurality of deformed images.

10. An image processing apparatus according to claim 5, wherein
    said assistance image generating unit comprises an average image generation processing unit for generating an average image with respect to said basis image and said plurality of deformed images.

11. An image processing apparatus according to claim 1, wherein said image processing apparatus further comprises a parameter setting unit for setting a threshold of a parameter becoming a basis for selecting image information of said reference image; and an external interface control unit for making a change in said threshold of said parameter of said parameter setting unit in accordance with said user's visual recognition result of said assistance images displayed in said assistance image display unit.

12. An image processing apparatus according to claim 1, wherein said image processing apparatus further comprises an external interface control unit for making a change in number of said plurality of reference images in accordance with said user's visual recognition result of said assistance images displayed in said assistance image display unit.

13. An image processing apparatus according to claim 1, wherein said image processing apparatus further comprises an external interface control unit for making a change in number of said plurality of low-resolution images that are inputted into said image input unit in accordance with said user's visual recognition result of said assistance images displayed in said assistance image display unit.

14. An image processing apparatus according to claim 1, wherein said image processing apparatus further comprises an external interface control unit for performing selection of said reference images in accordance with said user's visual recognition result of said assistance images displayed in said assistance image display unit.

* * * * *